(No Model.)

L. K. BÖHM.
ACETYLENE GAS TIP.

No. 606,441.  Patented June 28, 1898.

WITNESSES:
D. N. Hayward
William Law

INVENTOR
Ludwig K. Böhm

UNITED STATES PATENT OFFICE.

LUDWIG K. BÖHM, OF NEW YORK, N. Y., ASSIGNOR TO THE ELECTRO GAS COMPANY, OF WEST VIRGINIA.

ACETYLENE-GAS TIP.

SPECIFICATION forming part of Letters Patent No. 606,441, dated June 28, 1898.

Application filed May 8, 1896. Renewed May 25, 1898. Serial No. 681,754. (No model.)

*To all whom it may concern:*

Be it known that I, LUDWIG K. BÖHM, a subject of the Emperor of Germany, and a resident of New York city, in the county and State of New York, have invented certain new and useful Improvements in Acetylene-Gas Tips, of which the following is a specification.

My invention relates to improvements in acetylene-gas tips, and the special object of the same is to mix air with the acetylene gas near the openings or outlet of the tip.

My novel gas-tip may also be used for other gases which are to be mixed with air.

Acetylene gas may be mixed with air in various proportions without impairing its luminosity. Certain mixtures of acetylene gas and air even give a brighter light than acetylene alone. When both gases are mixed, say, in equal proportions, then the mixture will occupy twice the space as acetylene alone. Further, it is very undesirable to have the air mixed with the acetylene when this gas is to be liquefied, which is the most convenient form for almost every use of acetylene as a light-giving agent. When acetylene and air are mixed, then a considerable saving is made, because less acetylene is used per hour and candle-power.

It is the object of this invention to mix air with acetylene and to avoid having the air in the vessel with the liquefied acetylene or the gasometer. To accomplish this, I mix the air and the gas near the outlet. The device in which this is done is a novel gas-tip, which may be made of soapstone or any suitable metal or material.

The novel device is illustrated in the accompanying drawings, in which—

Figure 1:
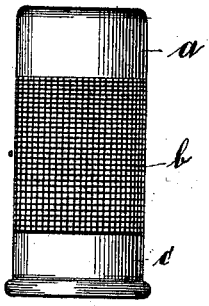
Figure 3:
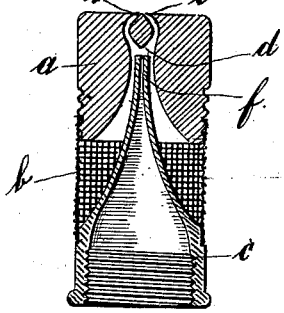
Figure 2:
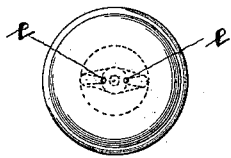

Figure 1 is a front view of my new tip. Fig. 2 is a top plan. Fig. 3 is a vertical section, and Fig. 4 is a vertical section with the wire screen partly in section.

My new tip consists, essentially, of three parts, the upper part $a$, with the outlet, the wire screen or mantle $b$, and the lower portion $c$, which forms the outlet for the acetylene and is the part which is connected with the gas-fixture. The acetylene passes through the part $c$, Fig. 3, enters into the channel $d$, and leaves through the openings $e$, where it is lighted. The outlet may also form a half-circular slot, as in the common gas-tips. The acetylene, always being under pressure, will draw in air through the wire-gauze mantle, which will mix with the gas, and when lighted will burn with the acetylene. Wire screen is used, so that the gas or mixture will never ignite below the openings $e$.

Figure 4:
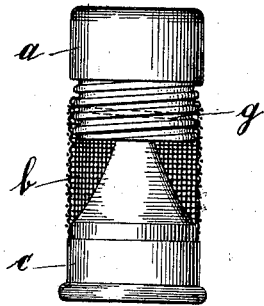

The quantity of air may be varied by the device shown in Figs. 3 and 4, which further show how the tip is adjustable. The lower portion of the top part $a$ is provided with grooves similar to a screw-thread, which rests partly in the wire-gauze mantle. To the latter is connected a permanent wire $g$ of circular shape, which slides in the grooves, and upon turning the top part $a$ up, for instance, more surface of the wire screen will be free and accessible to the air. Consequently a larger proportion of air will be drawn in. If, on the contrary, the top part $a$ is turned down, then less surface of the wire-gauze mantle will be free and less air will be drawn in. The wire-gauze mantle, as is shown in Figs. 3 and 4, is permanently fixed to the lower part $c$. The lower portion $c$ is provided with a screw-thread inside, as shown in Fig. 3.

The tips are made in various sizes. They may be small as common gas-tips, and they may be large for large street-lights. I do not limit myself to any particular shape.

What I claim, and desire to secure by Letters Patent, is—

1. An adjustable gas tip or burner for mixing gas and air and consisting of an imperforate lower part having a nozzle extending therefrom which forms the outlet for the gas, an adjustable tip proper threaded at its lower outside portion and forming the outlet for the mixture and a wire-gauze mantle connecting the same, substantially as described.

2. In an adjustable gas tip or burner for mixing gas and air in various proportions and consisting of an imperforate lower part having a nozzle extending therefrom which forms the outlet for the gas, an adjustable tip proper threaded at its lower outside portion and forming the outlet for the mixture in combination with a wire-gauze mantle between the two and connecting the same, substantially as described.

In testimony whereof I have hereunto set my hand in the presence of two subscribing witnesses.

LUDWIG K. BÖHM.

Witnesses:
  WILLIAM LAW,
  JAMES A. SIMONS.